United States Patent
Barbosa et al.

(10) Patent No.: US 7,755,918 B2
(45) Date of Patent: Jul. 13, 2010

(54) CONVERTER CIRCUIT FOR SWITCHING A LARGE NUMBER OF SWITCHING VOLTAGE LEVELS

(75) Inventors: Peter Barbosa, Taoyuan County (TW);
Peter Steimer, Ehrendingen (CH);
Toufann Chaudhuri, Morges (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 12/421,660

(22) Filed: Apr. 10, 2009

(65) Prior Publication Data

US 2009/0231896 A1 Sep. 17, 2009

Related U.S. Application Data

(63) Continuation of application No. PCT/EP2007/060758, filed on Oct. 10, 2007.

(30) Foreign Application Priority Data

Oct. 18, 2006 (EP) .................................. 06405441

(51) Int. Cl.
*H02M 7/537* (2006.01)
*G05F 1/10* (2006.01)
(52) U.S. Cl. ....................................... 363/131; 323/239
(58) Field of Classification Search ................ 323/239, 323/324; 363/71, 131, 132, 156
See application file for complete search history.

(56) References Cited

U.S. PATENT DOCUMENTS

| 5,737,201 | A | 4/1998 | Meynard et al. |
| 6,014,323 | A * | 1/2000 | Aiello et al. ................ 363/71 |
| 7,122,991 | B2 * | 10/2006 | Kitajima et al. ............ 318/800 |
| 2008/0238214 | A1 * | 10/2008 | Barbosa et al. ............ 307/113 |

FOREIGN PATENT DOCUMENTS

| DE | 27 40 702 A1 | 3/1979 |
| DE | 692 05 413 T2 | 6/1996 |

(Continued)

OTHER PUBLICATIONS

Form PCT/ISA/210 (International Search Report, with English language translation of category of cited documents) dated Jan. 30, 2008.

(Continued)

*Primary Examiner*—Adolf Berhane
(74) *Attorney, Agent, or Firm*—Buchanan Ingersoll & Rooney PC (57) ABSTRACT

A converter circuit for switching a large number of switching voltage levels is specified, in which a first switching group is provided for each. Second switching groups are provided, each having a first, second, third, fourth, fifth and sixth drivable bidirectional power semiconductor switch and capacitor. The first drivable bidirectional power semiconductor switch is reverse-connected in series with the second drivable bidirectional power semiconductor switch, the third drivable bidirectional power semiconductor switch is reverse-connected in series with the fourth drivable bidirectional power semiconductor switch, the first drivable bidirectional power semiconductor switch is connected to the capacitor, the third drivable bidirectional power semiconductor switch is connected to the capacitor, the fifth drivable bidirectional power semiconductor switch is directly connected to the fourth drivable bidirectional power semiconductor switch, and the sixth drivable bidirectional power semiconductor switch is directly connected to the second drivable bidirectional power semiconductor switch.

16 Claims, 7 Drawing Sheets

FOREIGN PATENT DOCUMENTS

WO     WO 2006/053448 A1     5/2006

OTHER PUBLICATIONS

Non-English version of Form PCT/ISA/237 (Written Opinion of the International Searching Authority) dated Jan. 30, 2008.

European Search Report (with English language translation of category of cited documents) dated May 10, 2007.

Notification of Transmittal of Copies of Translation of the International Preliminary Report on Patentability and Written Opinion of the International Searching Authority (Forms PCT/IB/338, PCT/IB/373, and PCT/ISA/237) issued in corresponding International Patent Application No. PCT/CH2006/000525 dated May 22, 2009, The International Bureau of WIPO, Geneva, Switzerland.

\* cited by examiner

CONVERTER CIRCUIT FOR SWITCHING A LARGE NUMBER OF SWITCHING VOLTAGE LEVELS

RELATED APPLICATIONS

This application claims priority under 35 U.S.C. §119 to EP Application 06405441.4 filed in Europe on Oct. 18, 2006, and as a continuation application under 35 U.S.C. §120 to PCT/EP2007/060758 filed as an International Application on Oct. 10, 2007 designating the U.S., the entire contents of which are hereby incorporated by reference in their entireties.

TECHNICAL FIELD

The disclosure relates to the field of power electronics. It is based on a converter circuit for switching a large number of switching voltage levels.

BACKGROUND INFORMATION

Converter circuits are used nowadays in a wealth of power electronic applications. The requirements made of such a converter circuit here include, firstly, generating harmonics as little as possible on phases of an electrical AC voltage system conventionally connected to the converter circuit and, secondly, transmitting the largest possible powers with a smallest possible number of electronic components. A suitable converter circuit for switching a large number of switching voltage levels is specified in DE 692 05 413 T2, wherein a first switching group and n further first switching groups are provided for each phase, wherein n≧1 and the first switching group is formed by a first drivable bidirectional power semiconductor switch and a second drivable bidirectional power semiconductor switch and the n further first switching groups are each formed by a first drivable bidirectional power semiconductor switch and a second drivable bidirectional power semiconductor switch and by a capacitor connected to the first and second drivable bidirectional power semiconductor switches. Each of the first switching groups is connected in interlinked fashion to the respective adjacent first switching group, wherein the first and the second drivable bidirectional power semiconductor switch of the first further first switching group are connected to one another. The first and the second drivable bidirectional power semiconductor switches are each formed by a bipolar transistor having a drive electrode arranged in insulated fashion (IGBT—Insulated Gate Bipolar Transistor), and by a diode reverse-connected in parallel with the bipolar transistor.

A further generic converter circuit for switching a large number of switching voltage levels is specified in WO 2006/053448 A1.

What is problematic about a converter circuit for switching a large number of switching voltage levels according to DE 692 05 413 T2 is that the electrical energy stored in the converter circuit during operation is very high. Since the electrical energy is stored in the capacitors of the n first switching groups of the converter circuit, the capacitors have to be designed for this electrical energy, that is to say with regard to their dielectric strength and/or their capacitance. However, this necessitates capacitors having a large structural size, which are correspondingly expensive. Moreover, the converter circuit requires a large amount of space on account of the capacitors that are large with regard to the structural size, with the result that a space-saving construction such as is required for many applications, for example for traction applications, is not possible. Furthermore, the use of the capacitors that are large with regard to the structural size brings about a high mounting and maintenance outlay. Furthermore, the converter circuit for switching a large number of switching voltage levels according to DE 692 05 413 T2, on account of the exclusive use of bipolar transistors having a drive electrode arranged in insulated fashion as drivable power semiconductor switches, is susceptible to high voltages, in particular to overvoltages, and additionally has considerable active power losses.

SUMMARY

Exemplary embodiments disclosed herein are directed to a converter circuit for switching a large number of switching voltage levels which stores as little electrical energy as possible during its operation, can be realized in space-saving fashion, is to the greatest possible extent insensitive to high voltages and fault states and has low active power losses.

A converter circuit for switching a large number of switching voltage levels is disclosed, comprising a first switching group provided for each phase wherein the first switching group is formed by a first drivable bidirectional power semiconductor switch and a second drivable bidirectional power semiconductor switch and the first and the second drivable bidirectional power semiconductor switches of the first switching group are connected to one another, wherein n second switching groups are provided, each having a first, second, third, fourth, fifth and sixth drivable bidirectional power semiconductor switch and a capacitor, wherein n≧1 and the first drivable bidirectional power semiconductor switch is reverse-connected in series with the second drivable bidirectional power semiconductor switch, the third drivable bidirectional power semiconductor switch is reverse-connected in series with the fourth drivable bidirectional power semiconductor switch, the first drivable bidirectional power semiconductor switch is connected to the capacitor, the third drivable bidirectional power semiconductor switch is connected to the capacitor, the fifth drivable bidirectional power semiconductor switch is directly connected to the fourth drivable bidirectional power semiconductor switch and directly connected to the junction point between the first drivable bidirectional power semiconductor switch and the capacitor, and the sixth drivable bidirectional power semiconductor switch is directly connected to the second drivable bidirectional power semiconductor switch and directly connected to the junction point between the third drivable bidirectional power semiconductor switch and the capacitor, wherein, for n>1, each of the n second switching groups is interlinked with the respective adjacent second switching, wherein the first switching group is connected to the first second switching group, wherein a third switching group and a fourth switching group are provided, each having a first drivable bidirectional power semiconductor switch, a second drivable bidirectional power semiconductor switch, and a capacitor connected to the first and second drivable bidirectional power semiconductor switches, wherein the first and second drivable bidirectional power semiconductor switches are connected to one another, wherein the third switching group is connected to the n-th second switching group, wherein the fourth switching group is connected to the n-th second switching group, and wherein the third switching group is connected to the fourth switching group.

A converter circuit for switching a large number of switching voltage levels is disclosed, comprising a first switching group provided for each phase wherein the first switching group is formed by a first drivable bidirectional power semiconductor switch and a second drivable bidirectional power semiconductor switch and the first and the second drivable bidirectional power semiconductor switches of the first switching group are connected to one another, wherein n second switching groups are provided, each having a first, second, third, fifth and sixth drivable bidirectional power semiconductor switch and a capacitor, wherein n≧1 and the first drivable bidirectional power semiconductor switch is reverse-connected in series with the second drivable bidirectional power semiconductor switch, the third drivable bidirectional power semiconductor switch is reverse-connected in series with the fourth drivable bidirectional power semiconductor switch, the first drivable bidirectional power semiconductor switch is connected to the capacitor, the third drivable bidirectional power semiconductor switch is connected to the capacitor, the fifth drivable bidirectional power semiconductor switch is directly connected to the fourth drivable bidirectional power semiconductor switch and directly connected to the junction point between the first drivable bidirectional power semiconductor switch and the capacitor, and the sixth drivable bidirectional power semiconductor switch is directly connected to the second drivable bidirectional power semiconductor and directly connected to the junction point between the third drivable bidirectional power semiconductor switch and the capacitor, wherein, for n>1, each of the n second switching groups is interlinked with the respective adjacent second switching group, wherein the first switching group is connected to the first second switching group, wherein a third switching group and a fourth switching group are provided, each having a first drivable bidirectional power semiconductor switch, a second drivable bidirectional power semiconductor switch, and a capacitor connected to the first and second drivable bidirectional power semiconductor switches, wherein the first and second drivable bidirectional power semiconductor switches are connected to one another, wherein p fifth switching groups are provided, each a first and a second drivable bidirectional power semiconductor switch, wherein p>1, wherein, for p>1, each of the p fifth switching groups is interlinked with the respective adjacent fifth switching group, in that the first fifth switching group is connected to the n-th second switching group, wherein the third switching group is connected to the p-th fifth switching group, wherein the fourth switching group is connected to the p-th fifth switching group, and wherein the third switching group is connected to the fourth switching group.

These and further objects, advantages and features of the present disclosure will become apparent from the following detailed description of exemplary embodiments of the disclosure in conjunction with the drawings.

The reference symbols used in the drawing, and their meanings, are summarized in the List of reference symbols. In principle, identical parts are provided with identical reference symbols in the figures. The exemplary embodiments described represent the subject matter of the disclosure by way of example and have no restrictive effect.

DETAILED DESCRIPTION

The converter circuit according to the disclosure for switching a large number of switching voltage levels comprises a first switching group provided for each phase wherein the first switching group is formed by a first drivable bidirectional power semiconductor switch and a second drivable bidirectional power semiconductor switch and the first and the second drivable bidirectional power semiconductor switches of the first switching group are connected to one another. According to the disclosure, n second switching groups are now provided, each having a first, second, third, fourth, fifth and sixth drivable bidirectional power semiconductor switch and capacitor, wherein n≧1 and the first drivable bidirectional power semiconductor switch is reverse-connected in series with the second drivable bidirectional power semiconductor switch, the third drivable bidirectional power semiconductor switch is reverse-connected in series with the fourth drivable bidirectional power semiconductor switch, the first drivable bidirectional power semiconductor switch is connected to the capacitor, the third drivable bidirectional power semiconductor switch is connected to the capacitor, the fifth drivable bidirectional power semiconductor switch is directly connected to the fourth drivable bidirectional power semiconductor switch and directly connected to the junction point between the first drivable bidirectional power semiconductor switch and the capacitor, and the sixth drivable bidirectional power semiconductor switch is directly connected to the second drivable bidirectional power semiconductor switch and directly connected to the junction point between the third drivable bidirectional power semiconductor switch and the capacitor. Furthermore, for n>1, each of the n second switching groups is interlinked with the respective adjacent second switching group, and the first switching group is connected to the first second switching group. Furthermore, a third switching group and a fourth switching group are provided, each having a first drivable bidirectional power semiconductor switch, a second drivable bidirectional power semiconductor switch, and a capacitor connected to the first and second drivable bidirectional power semiconductor switches, wherein the first and second drivable bidirectional power semiconductor switches are connected to one another. The third switching group is connected to the n-th second switching group, the fourth switching group is connected to the n-th second switching group, and the third switching group is connected to the fourth switching group. As an alternative, p fifth switching groups are provided, each having a first and a second drivable bidirectional power semiconductor switch, wherein p≧1 and, for p>1, each of the p fifth switching groups is interlinked with the respective adjacent fifth switching group. The first fifth switching group is then connected to the n-th second switching group, the third switching group is connected to the p-th fifth switching group, the fourth switching group is connected to the p-th fifth switching group, and the third switching group is connected to the fourth switching group. The p fifth switching groups advantageously produce additional redundancy with regard to the drivable bidirectional power semiconductor switches of the converter circuit according to the disclosure.

Given an identical number of switching voltage levels, the converter circuit according to the disclosure, by means of the n second switching groups provided and by means of the third and fourth switching groups and also by means of the p fifth switching groups and their connections described above, can advantageously result in the number of capacitors of the converter circuit being reduced in comparison with converter circuits according to the prior art and, moreover, in the stored electrical energy of the converter circuit being reduced. Consequently, the stored electrical energy of the converter circuit can be kept small overall, whereby the capacitors of the converter circuit only have to be designed for a small electrical energy to be stored, that is to say with regard to their dielectric strength and/or their capacitance. On account of the resultant small structural size of the capacitors, the converter circuit requires very little space, with the result that a space-saving construction such as is required for many applications, for example for traction applications, is advantageously possible. Moreover, the mounting and maintenance outlay can also advantageously be kept small as a result of the small structural size of the capacitors.

Figure 1:
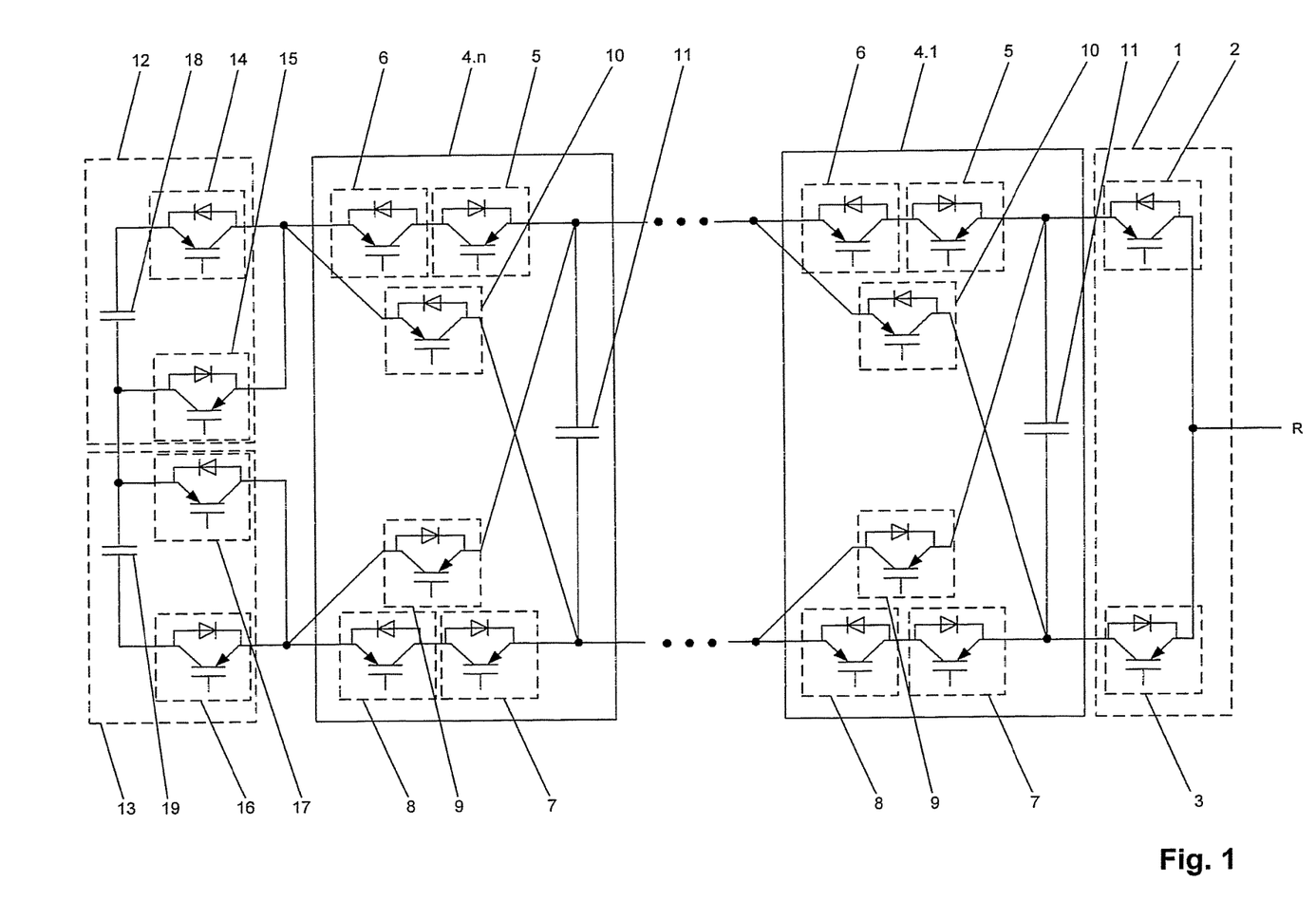
FIG. 1 shows a first exemplary embodiment of a converter circuit according to the disclosure.

FIG. 1 shows an, in particular single-phase, first exemplary embodiment of a converter circuit according to the disclosure for switching a large number of switching voltage levels, wherein the converter circuit comprises a first switching group 1 provided for each phase R, S, T, wherein the first switching group 1 is formed by a first drivable bidirectional power semiconductor switch 2 and a second drivable bidirectional power semiconductor switch 3, and the first and the second drivable bidirectional power semiconductor switches 2, 3 of the first switching group 1 are connected to one another. The junction point between the first and the second drivable bidirectional power semiconductor switches 2, 3 of the first switching group 1 forms a phase connection, in particular for the phase R, in accordance with FIG. 1.

According to the disclosure, now n second switching groups 4.1, . . . 4.n are provided, each having a first, second, third, fourth, fifth and sixth drivable bidirectional power semiconductor switch 5, 6, 7, 8, 9, 10 and a capacitor 11, wherein n≧1 and the first drivable bidirectional power semiconductor switch 5 is reverse-connected in series with the second drivable bidirectional power semiconductor switch 6, the third drivable bidirectional power semiconductor switch 7 is reverse-connected in series with the fourth drivable bidirectional power semiconductor switch 8, the first drivable bidirectional power semiconductor switch 5 is connected to the capacitor 11, the third drivable bidirectional power semiconductor switch 7 is connected to the capacitor 11, the fifth drivable bidirectional power semiconductor switch 9 is directly connected to the fourth drivable bidirectional power semiconductor switch 8 and directly connected to the junction point between the first drivable bidirectional power semiconductor switch 5 and the capacitor 11, and the sixth drivable bidirectional power semiconductor switch 10 is directly connected to the second drivable bidirectional power semiconductor switch 6 and directly connected to the junction point between the third drivable bidirectional power semiconductor switch 7 and the capacitor 11. Since, in accordance with FIG. 1, each of the n second switching groups 4.1, . . . 4.n is a four-terminal network, for n>1 each of the n second switching groups 4.1, . . . 4.n is interlinked with the respective adjacent second switching group 4.1, . . . 4.n. Furthermore, in accordance with FIG. 1, the first switching group 1 is connected to the first second switching group 4.1, and a third switching group 12 and a fourth switching group 13 are provided, each having a first drivable bidirectional power semiconductor switch 14, 16, a second drivable bidirectional power semiconductor switch 15, 17, and a capacitor 18, 19 connected to the first and second drivable bidirectional power semiconductor switches 14, 15, 16, 17, wherein the first and second drivable bidirectional power semiconductor switches 14, 15, 16, 17 are connected to one another. Furthermore, in accordance with FIG. 1, the third switching group 12 is connected to the n-th second switching group 4.n, the fourth switching group 13 is connected to the n-th second switching group 4.n, and the third switching group 12 is connected to the fourth switching group 13. As an alternative, in the case of a second exemplary embodiment of the converter circuit according to the disclosure according to FIG. 2, P fifth switching groups 20.1, . . . 20.p are provided, each having a first and a second drivable bidirectional power semiconductor switch 21, 22, wherein p>1. Since, in accordance with FIG. 2, each of the p fifth switching groups 20.1, . . . 20.p is a four-terminal network, for p>1 each of the p fifth switching groups 20.1, . . . 20.p is interlinked with the respective adjacent fifth switching group 20.1, . . . 20.p. In accordance with FIG. 2, then the first fifth switching group 20.1 is connected to the n-th second switching group 4.n, the third switching group 12 is connected to the p-th fifth switching group 20.p, the fourth switching group 13 is connected to the p-th fifth switching group 20.p, and the third switching group 12 is connected to the fourth switching group 13. The p fifth switching groups 20.1, . . . 20.p advantageously produce additional redundancy with regard to the drivable bidirectional power semiconductor switches of the converter circuit according to the disclosure.

Given an identical number of switching voltage levels, the converter circuit according to the disclosure, by means of the n second switching groups 4.1, . . . , 4.n provided and by means of the third and fourth switching groups 12,13 and also by means of the p fifth switching groups 20.1, . . . , 20.p and their connections described above, can result in the number of capacitors 11, 18, 19, 23 of the converter circuit being kept small and, moreover, in the stored electrical energy of the converter circuit being reduced. Consequently, the stored electrical energy of the converter circuit can be kept small overall, whereby the capacitors 11, 18, 19, 23 of the converter circuit only have to be designed for a small electrical energy to be stored, that is to say with regard to their dielectric strength and/or their capacitance. On account of the resultant small structural size of the capacitors, the converter circuit requires very little space, with the result that a space-saving construction such as is required for many applications, for example for traction applications, is advantageously possible. Moreover, the mounting and maintenance outlay can also advantageously be kept small as a result of the small structural size of the capacitors 11, 18, 19, 23.

If n=1 second switching groups 4.1, . . . 4.n are chosen for example in the case of the first exemplary embodiment according to FIG. 1, then a converter circuit for switching nine switching voltage levels with just three capacitors is achieved. If n=1 second switching groups 4.1, . . . 4.n and p=1 fifth switch groups 20.1, . . . 20.p are chosen for example in the case of the second exemplary embodiment according to FIG. 2, then a converter circuit for switching nine switching voltage levels likewise with only three capacitors is achieved, wherein additional redundancy with regard to the drivable bidirectional power semiconductor switches of the converter circuit is advantageously present as a result of the p=1 fifth switching group 20.1, . . . 20.p.

In accordance with FIG. 1, the first drivable bidirectional power semiconductor switch 2 of the first switching group 1 is connected to the junction point between the first drivable bidirectional power semiconductor switch 5 and the capacitor 11 of the first second switching group 4.1, and the second power semiconductor switch 3 of the first switching group 1 is connected to the junction point between the third drivable bidirectional power semiconductor switch 7 and the capacitor 11 of the first second switching group 4.1. The junction point between the first drivable bidirectional power semiconductor switch 14 and the second drivable bidirectional power semiconductor switch 15 of the third switching group 12 is furthermore connected to the junction point between the second drivable bidirectional power semiconductor switch 6 and the sixth drivable bidirectional power semiconductor switch 10 of the n-th second switching group 4.n. The junction point between the first drivable bidirectional power semiconductor switch 16 and the second drivable bidirectional power semiconductor switch 17 of the fourth switching group 13 is furthermore connected to the junction point between the fourth drivable bidirectional power semiconductor switch 8 and the fifth drivable bidirectional power semiconductor switch 9 of the n-th second switching group 4.n. In accordance with FIG. 1, the capacitor 18 of the third switching group 12 is connected to the capacitor 19 of the fourth switching group 13.

Figure 2:
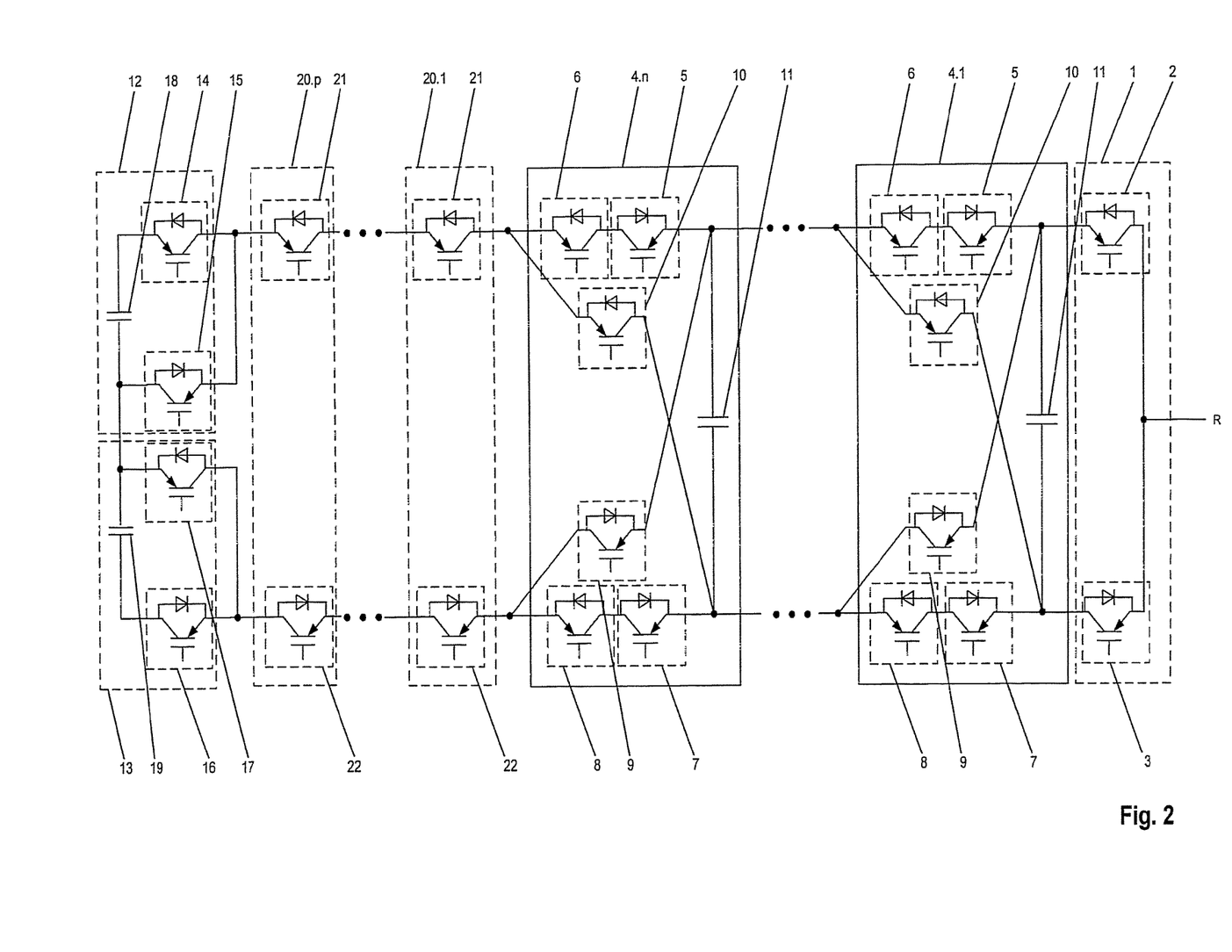
FIG. 2 shows a second exemplary embodiment of a converter circuit according to the disclosure.

In accordance with FIG. 2, the first drivable bidirectional power semiconductor switch 2 of the first switching group 1 is connected to the junction point between the first drivable bidirectional power semiconductor switch 5 and the capacitor 11 of the first second switching group 4.1, and the second drivable bidirectional power semiconductor switch 3 of the first switching group 1 is connected to the junction point between the third drivable bidirectional power semiconductor switch 7 and the capacitor 11 of the first second switching group 4.1. The first drivable bidirectional power semiconductor switch 21 of the first fifth switching group 20.1 is furthermore connected to the junction point between the second drivable bidirectional power semiconductor switch 6 and the sixth drivable bidirectional power semiconductor switch 10 of the n-th second switching group 4.n, and the second drivable bidirectional power semiconductor switch 22 of the first fifth switching group 20.1 is connected to the junction point between the fourth drivable bidirectional power semiconductor switch 8 and the fifth drivable bidirectional power semiconductor switch 9 of the n-th second switching group 4.n. The junction point between the first drivable bidirectional power semiconductor switch 14 and the second drivable bidirectional power semiconductor switch 15 of the third switching group 12 is furthermore connected to the first drivable bidirectional power semiconductor switch 21 of the p-th fifth switching group 20.p, and the junction point between the first drivable bidirectional power semiconductor switch 16 and the second drivable bidirectional power semiconductor switch 17 of the fourth switching group 13 is connected to the second drivable bidirectional power semiconductor switch 22 of the p-th fifth switching group 20.p. Finally, in accordance with FIG. 2, the capacitor 18 of the third switching group 12 is connected to the capacitor 19 of the fourth switching group 13.

Figure 3:
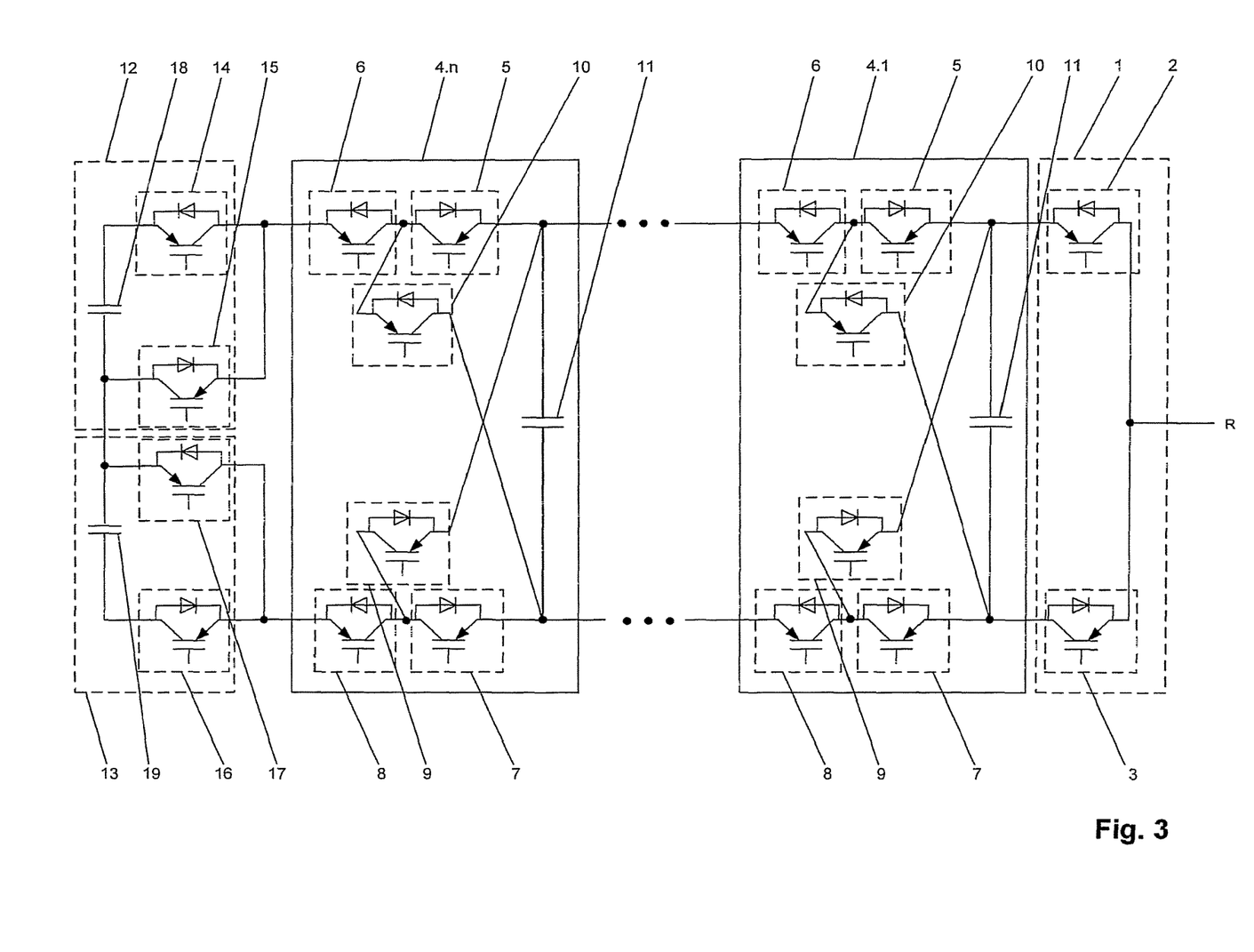
FIG. 3 shows a third exemplary embodiment of a converter circuit according to the disclosure.

FIG. 3 illustrates a third exemplary embodiment of a converter circuit according to the disclosure. Proceeding from FIG. 1, in FIG. 3 the first drivable bidirectional power semiconductor switch 2 of the first switching group 1 is connected to the junction point between the first drivable bidirectional power semiconductor switch 5 and the capacitor 11 of the first second switching group 4.1, and the second drivable bidirectional power semiconductor switch 3 of the first switching group 1 is connected to the junction point between the third drivable bidirectional power semiconductor switch 7 and the capacitor 11 of the first second switching group 4.1. In contrast to FIG. 1, the connection of the fifth drivable bidirectional power semiconductor switch 9 to the fourth drivable bidirectional power semiconductor switch 8 in the case of each second switching group 4.1, . . . 4.n is at the junction point between the fourth drivable bidirectional power semiconductor switch 8 and the third drivable bidirectional power semiconductor switch 7, and the connection of the sixth drivable bidirectional power semiconductor switch 10 to the second drivable bidirectional power semiconductor switch 6 in the case of each second switching group 4.1, . . . 4.n is at the junction point between the second drivable bidirectional power semiconductor switch 6 and the first drivable bidirectional power semiconductor switch 5. Furthermore, the junction point between the first drivable bidirectional power semiconductor switch 14 and the second drivable bidirectional power semiconductor switch 15 of the third switching group 12 is connected to the second drivable bidirectional power semiconductor switch 6 of the n-th second switching group 4.n. In addition, the junction point between the first drivable bidirectional power semiconductor switch 16 and the second drivable bidirectional power semiconductor switch 17 of the fourth switching group 13 is connected to the fourth drivable bidirectional power semiconductor switch 8 of the n-th second switching group 4.n, and the capacitor 18 of the third switching group 12 is connected to the capacitor 19 of the fourth switching group 13.

Figure 4:
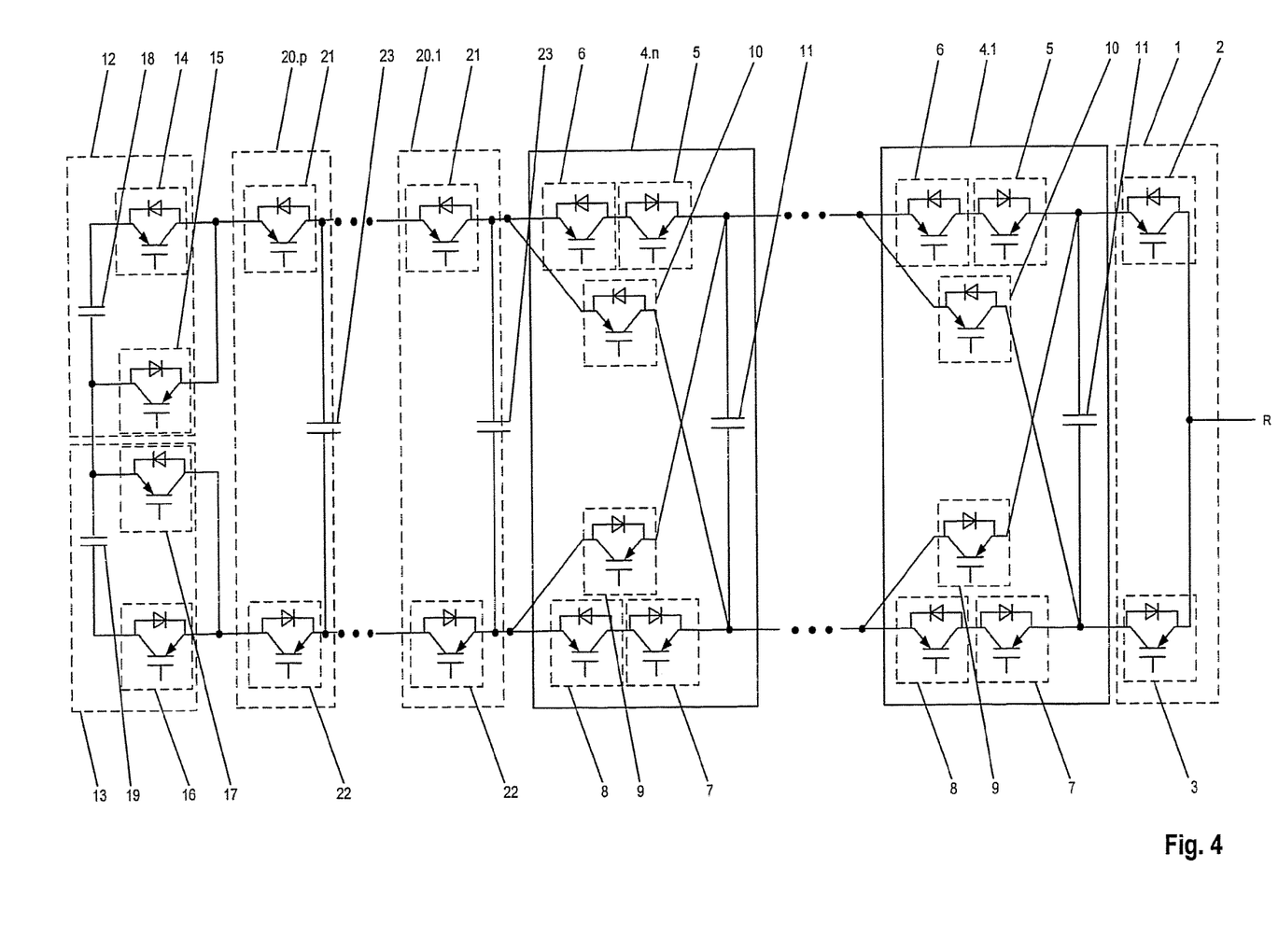
FIG. 4 shows a fourth exemplary embodiment of a converter circuit according to the disclosure.

FIG. 4 illustrates a fourth exemplary embodiment of a converter circuit according to the disclosure. Proceeding from FIG. 2, the converter circuit in FIG. 4 has each fifth switching group 20.1, . . . 20.p a capacitor 23 connected to the first and second drivable bidirectional power semiconductor switches 21, 22 of the associated fifth switching group 20.1, . . . 20.p, wherein the capacitor 23 of the first fifth switching group 20.1 is connected to the junction point between the first drivable bidirectional power semiconductor switch 21 of the first fifth switching group 20.1 and the junction point between the second drivable bidirectional power semiconductor switch 6 and the sixth drivable bidirectional power semiconductor switch 10 of n-th second switching group 4.n. The capacitor 23 of the first fifth switching group 20.1 is additionally connection to the junction point between the second drivable bidirectional power semiconductor switch 22 of the first fifth switching group 20.1 and the junction point between the fourth drivable bidirectional power semiconductor switch 8 and the fifth drivable bidirectional power semiconductor switch 9 of the n-th second switching group 4.n. If n=1 second switching groups 4.1, . . . 4.n and p=1 fifth switching groups 20.1, . . . 20.p are chosen for example in the case of the fourth exemplary embodiment according to FIG. 4, then a converter circuit for switching nine switching voltage levels with just four capacitors is achieved, wherein redundant switching state combinations of the drivable bidirectional power semiconductor switches, that is to say that a plurality of switching state combinations produce the same switching voltage level, can advantageously be achieved by means of the capacitor 23 of the respective fifth switching groups 20.1, . . . 20.p, whereby generally the voltage at the respective capacitor 11, 18, 19, 23 of the converter circuit can be stabilized and the drivable bidirectional power semiconductor switches of the converter circuit generate fewer losses and can thus be utilized more efficiently.

Figure 5:
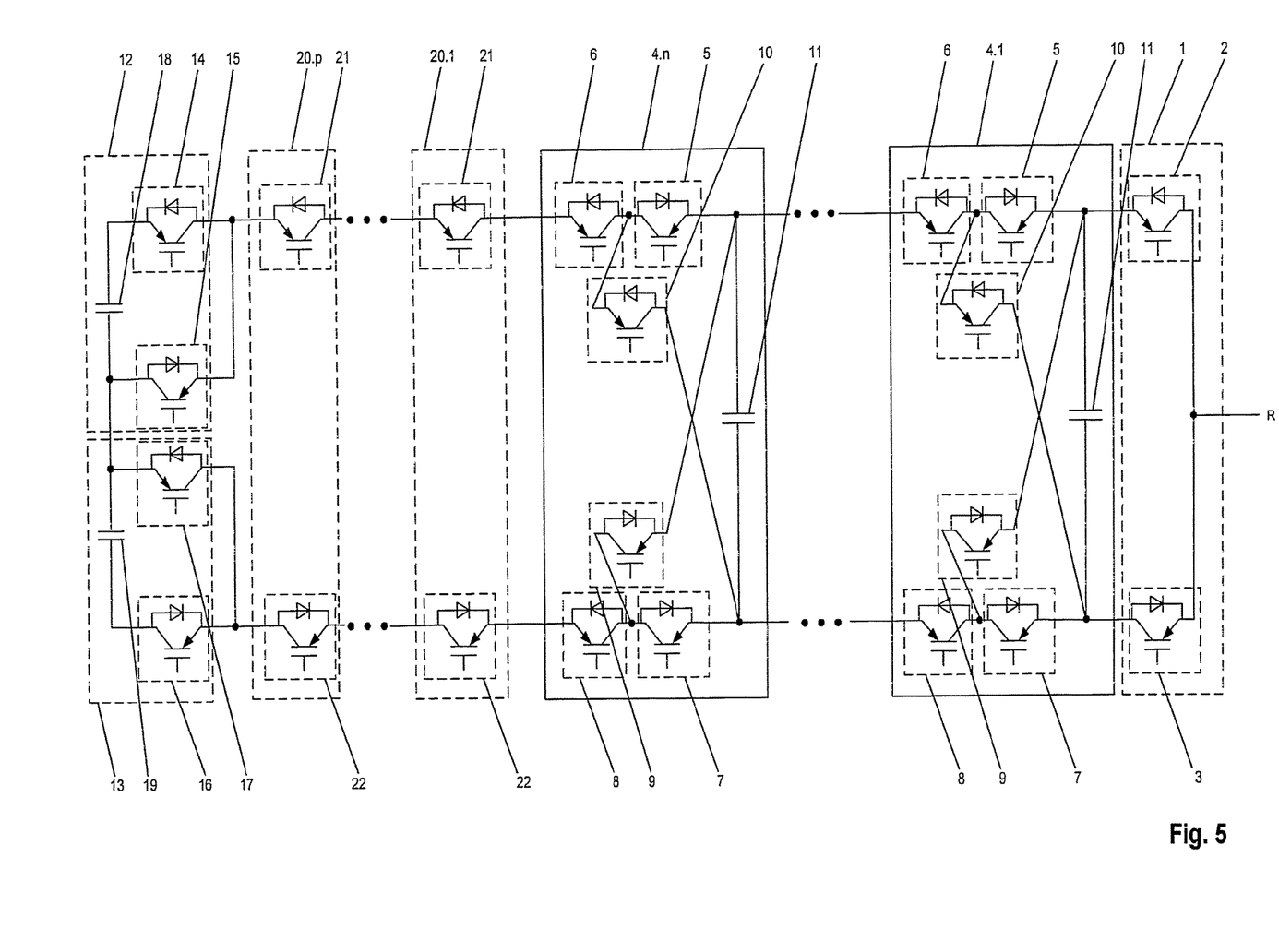
FIG. 5 shows a fifth exemplary embodiment of a converter circuit according to the disclosure.

FIG. 5 illustrates a fifth exemplary embodiment of a converter circuit according to the disclosure. Proceeding from FIG. 2, in FIG. 5 in a manner similar to that in FIG. 3, the first drivable bidirectional power semiconductor switch 2 of the first switching group 1 is connected to the junction point between the first drivable bidirectional power semiconductor switch 5 and the capacitor 11 of the first second switching group 4.1, and the second drivable bidirectional power semiconductor switch 3 of the first switching group 1 is connected to the junction point between the third drivable bidirectional power semiconductor switch 7 and the capacitor 11 of the first second switching group 4.1. In accordance with FIG. 5, the connection of the fifth drivable bidirectional power semiconductor switch 9 to the fourth drivable bidirectional power semiconductor switch 8 in the case of each second switching group 4.1, . . . 4.n is at the junction point between the fourth drivable bidirectional power semiconductor switch 8 and the third drivable bidirectional power semiconductor switch 7. Furthermore, the connection of the sixth drivable bidirectional power semiconductor switch 10 to the second drivable bidirectional power semiconductor switch 6 in the case of each second switching group 4.1, . . . 4.n is at the junction point between the second drivable bidirectional power semiconductor switch 6 and the first drivable bidirectional power semiconductor switch 5. In addition, the first drivable bidirectional power semiconductor switch 21 of the first fifth switching group 20.1 is connected to the second drivable bidirectional power semiconductor switch 6 of the n-th second switching group 4.n, and the the second drivable bidirectional power semiconductor switch 22 of the first fifth switching group 20.1 is connected to the fourth drivable bidirectional power semiconductor switch 8 of the n-th second switching group 4.n. The junction point between the first drivable bidirectional power semiconductor switch 14 and the second drivable bidirectional power semiconductor switch 15 of the third switching group 12 is furthermore connected to the first drivable bidirectional power semiconductor switch 21 of the p-th fifth switching group 20.p, and the junction point between the first drivable bidirectional power semiconductor switch 16 and the second drivable bidirectional power semiconductor switch 17 of the fourth switching group 13 is connected to the second drivable bidirectional power semiconductor switch 22 of the p-th fifth switching group 20.p. Finally, the capacitor 18 of the third switching group 12 is connected to the capacitor 19 of the fourth switching group 13. In accordance with FIG. 2, in the case of the exemplary embodiment according to FIG. 5, additional redundancy with regard to the drivable bidirectional power semiconductor switches of the converter circuit can advantageously be achieved by means of the p fifth switching groups 20.1, . . . 20.p.

Figure 6:
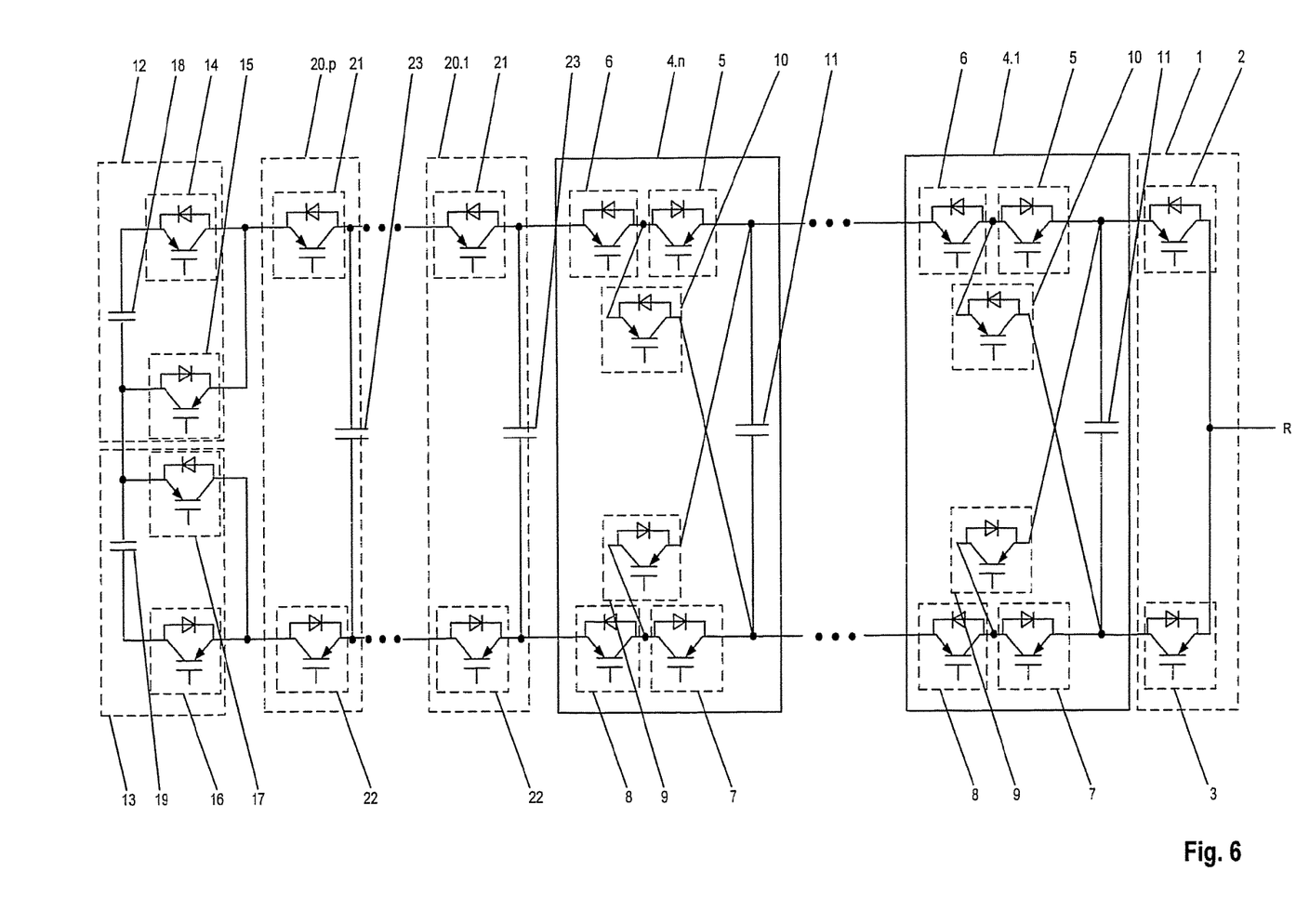
FIG. 6 shows a sixth exemplary embodiment of a converter circuit according to the disclosure.

FIG. 6 illustrates a sixth exemplary embodiment of a converter circuit according to the disclosure. Proceeding from FIG. 5, in FIG. 6 each fifth switching group 20.1, . . . 20.p has a capacitor 23 connected to the first and second drivable bidirectional power semiconductor switches 21, 22 of the associated fifth switching group 20.1, . . . 20.p, wherein the capacitor 23 of the first fifth switching group 20.1 is connected to the junction point between the first drivable bidirectional power semiconductor switch 21 of the first fifth switching group 20.1 and the second drivable bidirectional power semiconductor switch 6 of the n-th second switching group 4.n. Furthermore, the capacitor 23 of the first fifth switching group 20.1 is connected to the junction point between the second drivable bidirectional power semiconductor switch 22 of the first fifth switching group 20.1 and the fourth drivable bidirectional power semiconductor switch 8 of the n-th second switching group 4.n. If n=1 second switching groups 4.1, . . . 4.n and p=1 fifth switching groups 20.1, . . . 20.p are chosen for example in the case of the sixth exemplary embodiment according to FIG. 6, then a converter circuit for switching nine switching voltage levels with just four capacitors is achieved, wherein redundant switching state combinations of the drivable bidirectional power semiconductor switches, that is to say that a plurality of switching state combinations produce the same switching voltage level, can advantageously be achieved by means of the capacitor 23 of the respective fifth switching groups 20.1, . . . 20.p, whereby generally the voltage at the respective capacitor 11, 18, 19, 23 of the converter circuit can be stabilized and the drivable bidirectional power semiconductor switches of the converter circuit generate fewer losses and can thus be utilized more efficiently.

As a further variant with respect to FIG. 5 and in contrast to FIG. 6, it is also conceivable for only the first fifth switching group 20.1 to have a capacitor 23 connected to the first and second drivable bidirectional power semiconductor switches 21, 22 of first fifth switching group 20.1, wherein the capacitor 23 of the first fifth switching group 20.1 is connected to the junction point between the first drivable bidirectional power semiconductor switch 21 of the first fifth switching group 20.1 and the second drivable bidirectional power semiconductor switch 6 of the n-th second switching group 4.n. Furthermore, the capacitor 23 of the first fifth switching group 20.1 is connected to the junction point between the second drivable bidirectional power semiconductor switch 22 of the first fifth switching group 20.1 and the fourth drivable bidirectional power semiconductor switch 8 of the n-th second switching group 4.n. For n=1 second switching groups 4.1, . . . 4.n and p=2 fifth switching groups 20.1, . . . 20.p, wherein the first fifth switching groups 20.1 have the capacitor 23 and the second fifth switching groups 20.2 then have no capacitor 23, a converter circuit for switching nine switching voltage levels with just four capacitors is achieved, wherein redundant switching state combinations of the drivable bidirectional power semiconductor switches, that is to say that a plurality of switching state combinations produce the same switching voltage level, can advantageously be achieved by means of the capacitor 23 of the respective fifth switching groups 20.1, . . . 20.p, whereby generally the voltage at the respective capacitor 11, 18, 19, 23 of the converter circuit can be stabilized and the drivable bidirectional power semiconductor switches of the converter circuit generate fewer losses and can thus be utilized more efficiently.

As a further variant with respect to FIG. 5 and in contrast to FIG. 6, it is likewise conceivable for the first fifth switching group 20.1 and at least one further fifth switching group 20.2, . . . 20.p each to have a capacitor 23 connected to the first and second drivable bidirectional power semiconductor switches 21, 22 of the associated fifth switching group 20.1, 20.2, . . . , 20.p, wherein the capacitor 23 of the first fifth switching group 20.1 is connected to the junction point between the first drivable bidirectional power semiconductor switch 21 of the first fifth switching group 20.1 and the second drivable bidirectional power semiconductor switch 6 of the n-th second switching group 4.n. Furthermore, the capacitor 23 of the first fifth switching group 20.1 is connected to the junction point between the second drivable bidirectional power semiconductor switch 22 of the first fifth switching group 20.1 and the fourth drivable bidirectional power semiconductor switch 8 of the n-th second switching group 4.n.

Figure 7:
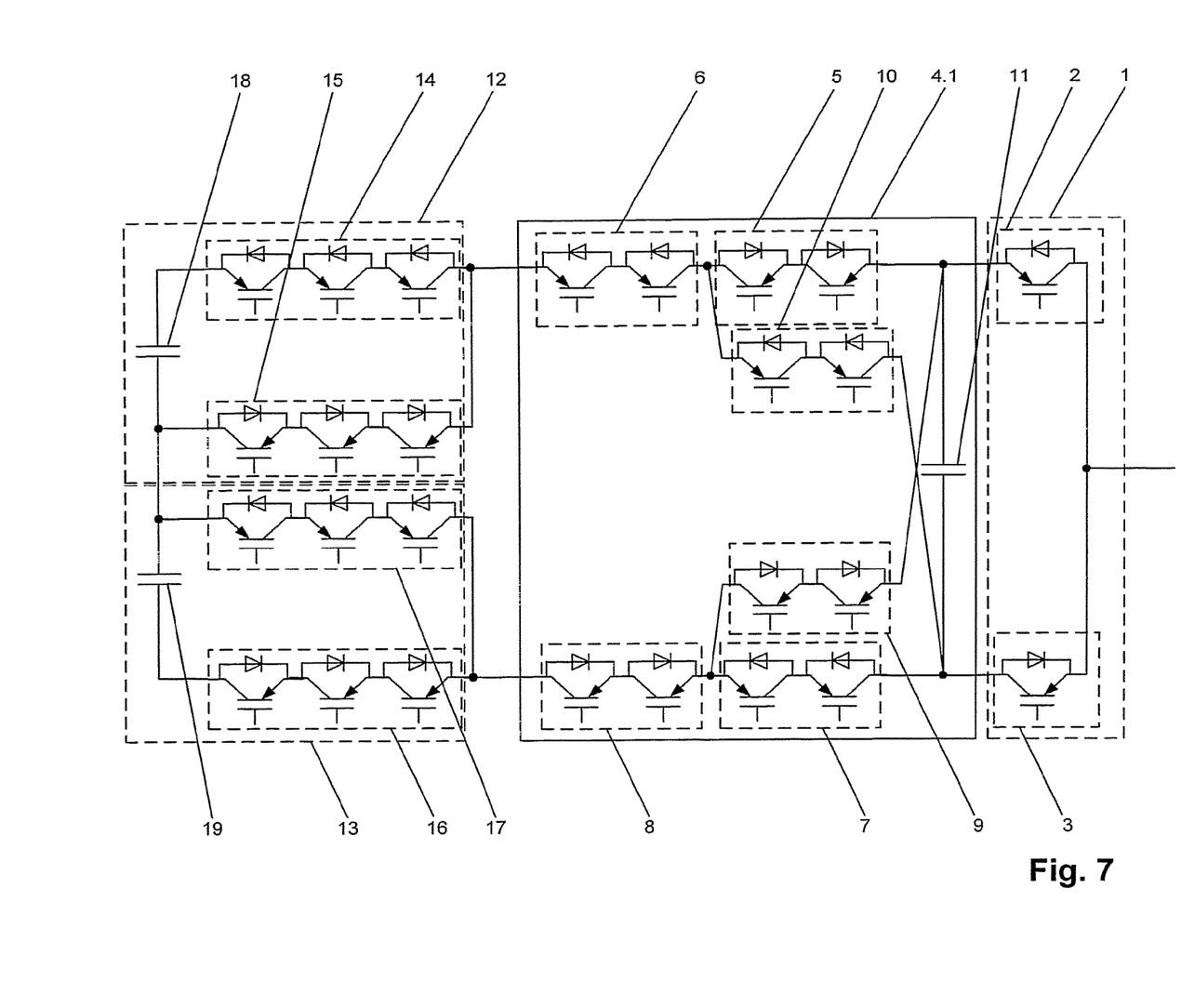
FIG. 7 shows a seventh exemplary embodiment of a converter circuit according to the disclosure.

In all the exemplary embodiments it is conceivable for the first, second, third, fourth, fifth and sixth drivable bidirectional power semiconductor switches 5, 6, 7, 8, 9, 10 of each second switching group 4.1, . . . 4.n preferably each to have at least two drivable bidirectional switching elements, wherein the drivable bidirectional switching elements are connected in series. It is thus advantageously possible to increase the voltage to be switched at the respective drivable bidirectional power semiconductor switches 5, 6, 7, 8, 9, 10. Furthermore, it is also possible for the first and second drivable bidirectional power semiconductor switches 21, 22 of each fifth switching group 20.1, . . . 20.p each to have at least two drivable bidirectional switching elements, wherein the drivable bidirectional switching elements are connected in series. In this case, too, it is possible to increase the voltage to be switched at the respective drivable bidirectional power semiconductor switch 21, 22. Furthermore, it is also possible for the first and second drivable bidirectional power semiconductor switches 14, 15 of the third switching group 12 and the first and second drivable bidirectional power semiconductor switches 16, 17 of the fourth switching group 13 each to have at least two drivable bidirectional switching elements, wherein the drivable bidirectional switching elements are connected in series. In that case, too, it is possible advantageously to increase the voltage to be switched at the respective drivable bidirectional power semiconductor switches 14, 15, 16, 17. Accordingly, any desired number of drivable bidirectional switching elements is possible for each drivable bidirectional power semiconductor switch 5, 6, 7, 8, 9, 10, 14, 15, 16, 17, 21, 22 with regard to the exemplary embodiments according to FIG. 1 to FIG. 6. In this respect, FIG. 7 illustrates a seventh exemplary embodiment of a converter circuit according to the disclosure, wherein by way of example n=1 second switching group 4.1, . . . 4.n is provided in accordance with FIG. 3 and the first, second, third, fourth, fifth and sixth drivable bidirectional power semiconductor switches 5, 6, 7, 8, 9, 10 of the single second switching group 4.1 each have two drivable bidirectional switching elements and the first and second drivable bidirectional power semiconductor switches 14, 15, 16, 17 of the third and fourth switching groups 12, 13 each have three drivable bidirectional switching elements.

The respective drivable bidirectional switching element of each drivable bidirectional power semiconductor switch of the converter circuit can be formed for example by a bipolar transistor having a drive electrode arranged in insulated fashion (IGBT—Insulated Gate Bipolar Transistor) and by a diode reverse-connected in parallel therewith. In order to be able to switch a high voltage at the capacitors 18, 19 of the third and fourth switching groups 12, 13, the drivable bidirectional switching element of the first and second drivable bidirectional power semiconductor switches 14, 15, 16, 17 of the third and fourth switching groups 12, 13 can be formed by an integrated thyristor having a commutated drive electrode (integrated gate commutated thyristor (IGCT)) and by a diode reverse-connected in parallel therewith.

Overall, the converter circuit according to the disclosure for switching a large number of switching voltage levels thus represents a solution which is characterized by a small stored electrical energy during its operation and by a space-saving construction and is therefore uncomplicated, robust and not very susceptible to interference.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Symbols

1 First switching group
2 First drivable bidirectional power semiconductor switch of the first switching group
3 Second drivable bidirectional power semiconductor switch of the first switching group
4.1, . . . 4.n Second switching groups
5 First drivable bidirectional power semiconductor switch of the second switching groups
6 Second drivable bidirectional power semiconductor switch of the second switching groups
7 Third drivable bidirectional power semiconductor switch of the second switching groups
8 Fourth drivable bidirectional power semiconductor switch of the second switching groups
9 Fifth drivable bidirectional power semiconductor switch of the second switching groups
10 Sixth drivable bidirectional power semiconductor switch of the second switching groups
11 Capacitor of the second switching groups
12 Third switching group
13 Fourth switching group
14 First drivable bidirectional power semiconductor switch of the third switching group
15 Second drivable bidirectional power semiconductor switch of the third switching group
16 First drivable bidirectional power semiconductor switch of the fourth switching group
17 Second drivable bidirectional power semiconductor switch of the fourth switching group
18 Capacitor of the of the third switching group
19 Capacitor of the fourth switching group
20.1, . . . 20.p Fifth switching groups
21 First drivable bidirectional power semiconductor switch of the fifth switching groups
22 Second drivable bidirectional power semiconductor switch of the fifth switching groups
23 Capacitor of the fifth switching group

What is claimed is:

1. A converter circuit for switching a large number of switching voltage levels, comprising a first switching group provided for each phase wherein the first switching group is formed by a first drivable bidirectional power semiconductor switch and a second drivable bidirectional power semiconductor switch and the first and the second drivable bidirectional power semiconductor switches of the first switching group are connected to one another, wherein n second switching groups are provided, each having a first, second, third, fourth, fifth and sixth drivable bidirectional power semiconductor switch and a capacitor, wherein n≧1 and the first drivable bidirectional power semiconductor switch is reverse-connected in series with the second drivable bidirectional power semiconductor switch, the third drivable bidirectional power semiconductor switch is reverse-connected in series with the fourth drivable bidirectional power semiconductor switch, the first drivable bidirectional power semiconductor switch is connected to the capacitor, the third drivable bidirectional power semiconductor switch is connected to the capacitor, the fifth drivable bidirectional power semiconductor switch is directly connected to the fourth drivable bidirectional power semiconductor switch and directly connected to the junction point between the first drivable bidirectional power semiconductor switch and the capacitor, and the sixth drivable bidirectional power semiconductor switch is directly connected to the second drivable bidirectional power semiconductor switch and directly connected to the junction point between the third drivable bidirectional power semiconductor switch and the capacitor, wherein, for n>1, each of the n second switching groups is interlinked with the respective adjacent second switching, wherein the first switching group is connected to the first second switching group, wherein a third switching group and a fourth switching group are provided, each having a first drivable bidirectional power semiconductor switch, a second drivable bidirectional power semiconductor switch, and a capacitor connected to the first and second drivable bidirectional power semiconductor switches, wherein the first and second drivable bidirectional power semiconductor switches are connected to one another, in that the third switching group is connected to the n-th second switching group, wherein the fourth switching group is connected to the n-th second switching group, and wherein the third switching group is connected to the fourth switching group.

2. A converter circuit for switching a large number of switching voltage levels, comprising a first switching group provided for each phase wherein the first switching group is formed by a first drivable bidirectional power semiconductor switch and a second drivable bidirectional power semiconductor switch and the first and the second drivable bidirectional power semiconductor switches of the first switching group are connected to one another, wherein n second switching groups are provided, each having a first, second, third, fourth, fifth and sixth drivable bidirectional power semiconductor switch and a capacitor, wherein n≧1 and the first drivable bidirectional power semiconductor switch is reverse-connected in series with the second drivable bidirectional power semiconductor switch, the third drivable bidirectional power semiconductor switch is reverse-connected in series with the fourth drivable bidirectional power semiconductor switch, the first drivable bidirectional power semiconductor switch is connected to the capacitor, the third drivable bidirectional power semiconductor switch is connected to the capacitor, the fifth drivable bidirectional power semiconductor switch is directly connected to the fourth drivable bidirectional power semiconductor switch and directly connected to the junction point between the first drivable bidirectional power semiconductor switch and the capacitor, and the sixth drivable bidirectional power semiconductor switch is directly connected to the second drivable bidirectional power semiconductor and directly connected to the junction point between the third drivable bidirectional power semiconductor switch and the capacitor, wherein, for n>1, each of the n second switching groups is interlinked with the respective adjacent second switching group, wherein the first switching group is connected to the first second switching group, wherein a third switching group and a fourth switching group are provided, each having a first drivable bidirectional power semiconductor switch, a second drivable bidirectional power semiconductor switch, and a capacitor connected to the first and second drivable bidirectional power semiconductor switches, wherein the first and second drivable bidirectional power semiconductor switches are connected to one another, wherein p fifth switching groups are provided, each a first and a second drivable bidirectional power semiconductor switch, wherein p>1, wherein, for p>1, each of the p fifth switching groups is interlinked with the respective adjacent fifth switching group, in that the first fifth switching group is connected to the n-th second switching group, wherein the third switching group is connected to the p-th fifth switching group, wherein the fourth switching group is connected to the p-th fifth switching group, and wherein the third switching group is connected to the fourth switching group.

3. The converter circuit as claimed in claim 1, wherein the first drivable bidirectional power semiconductor switch of the first switching group is connected to the junction point between the first drivable bidirectional power semiconductor switch and the capacitor of the first second switching group, and the second power semiconductor switch of the first switching group is connected to the junction point between the third drivable bidirectional power semiconductor switch and the capacitor of the first second switching group, wherein the junction point between the first drivable bidirectional power semiconductor switch and the second drivable bidirectional power semiconductor switch of the third switching group is connected to the junction point between the second drivable bidirectional power semiconductor switch and the sixth drivable bidirectional power semiconductor switch of the n-th second switching group, wherein the junction point between the first drivable bidirectional power semiconductor switch and the second drivable bidirectional power semiconductor switch of the fourth switching group is connected to the junction point between the fourth drivable bidirectional power semiconductor switch and the fifth drivable bidirectional power semiconductor switch of the n-th second switching group, and wherein the capacitor of the third switching group is connected to the capacitor of the fourth switching group.

4. The converter circuit as claimed in claim 1, wherein the first drivable bidirectional power semiconductor switch of the first switching group is connected to the junction point between the first drivable bidirectional power semiconductor switch and the capacitor of the first second switching group, and the second drivable bidirectional power semiconductor switch of the first switching group is connected to the junction point between the third drivable bidirectional power semiconductor switch and the capacitor of the first second switching group, wherein the connection of the fifth drivable bidirectional power semiconductor switch to the fourth drivable bidirectional power semiconductor switch in the case of each second switching group is at the junction point between the fourth drivable bidirectional power semiconductor switch and the third drivable bidirectional power semiconductor switch, and the connection of the sixth drivable bidirectional power semiconductor switch to the second drivable bidirectional power semiconductor switch in the case of each second switching group is at the junction point between the second drivable bidirectional power semiconductor switch and the first drivable bidirectional power semiconductor switch, wherein the junction point between the first drivable bidirectional power semiconductor switch and the second drivable bidirectional power semiconductor switch of the third switching group is connected to the second drivable bidirectional power semiconductor switch of the n-th second switching group, wherein the junction point between the first drivable bidirectional power semiconductor switch and the second drivable bidirectional power semiconductor switch of the fourth switching group is connected to the fourth drivable bidirectional power semiconductor switch of the n-th second switching group, and wherein the capacitor of the third switching group is connected to the capacitor of the fourth switching group.

5. The converter circuit as claimed in claim 2, wherein the first drivable bidirectional power semiconductor switch of the first switching group is connected to the junction point between the first drivable bidirectional power semiconductor switch and the capacitor of the first second switching group, and the second drivable bidirectional power semiconductor switch of the first switching group is connected to the junction point between the third drivable bidirectional power semiconductor switch and the capacitor of the first second switching group, wherein the first drivable bidirectional power semiconductor switch of the first fifth switching group is connected to the junction point between the second drivable bidirectional power semiconductor switch and the sixth drivable bidirectional power semiconductor switch of the n-th second switching group, wherein the second drivable bidirectional power semiconductor switch of the first fifth switching group is connected to the junction point between the fourth drivable bidirectional power semiconductor switch and the fifth drivable bidirectional power semiconductor switch of the n-th second switching group, wherein the junction point between the first drivable bidirectional power semiconductor switch and the second drivable bidirectional power semiconductor switch of the third switching group is connected to the first drivable bidirectional power semiconductor switch of the p-th fifth switching group, wherein the junction point between the first drivable bidirectional power semiconductor switch and the second drivable bidirectional power semiconductor switch of the fourth switching group is connected to the second drivable bidirectional power semiconductor switch of the p-th fifth switching group, and wherein the capacitor of the third switching group is connected to the capacitor of the fourth switching group.

6. The converter circuit as claimed in claim 2, wherein the first drivable bidirectional power semiconductor switch of the first switching group is connected to the junction point between the first drivable bidirectional power semiconductor switch and the capacitor of the first second switching group, and the second drivable bidirectional power semiconductor switch of the first switching group is connected to the junction point between the third drivable bidirectional power semiconductor switch and the capacitor of the first second switching group, wherein the connection of the fifth drivable bidirectional power semiconductor switch to the fourth drivable bidirectional power semiconductor switch in the case of each second switching group is at the junction point between the fourth drivable bidirectional power semiconductor switch and the third drivable bidirectional power semiconductor switch, and the connection of the sixth drivable bidirectional power semiconductor switch to the second drivable bidirectional power semiconductor switch in the case of each second switching group is at the junction point between the second drivable bidirectional power semiconductor switch and the first drivable bidirectional power semiconductor switch, wherein the first drivable bidirectional power semiconductor switch of the first fifth switching group is connected to the second drivable bidirectional power semiconductor switch of the n-th second switching group, wherein the second drivable bidirectional power semiconductor switch of the first fifth switching group is connected to the fourth drivable bidirectional power semiconductor switch of the n-th second switching group, wherein the junction point between the first drivable bidirectional power semiconductor switch and the second drivable bidirectional power semiconductor switch of the third switching group is connected to the first drivable bidirectional power semiconductor switch of the p-th fifth switching group, wherein the junction point between the first drivable bidirectional power semiconductor switch and the second drivable bidirectional power semiconductor switch of the fourth switching group is connected to the second drivable bidirectional power semiconductor switch of the p-th fifth switching group, and wherein the capacitor of the third switching group is connected to the capacitor of the fourth switching group.

7. The converter circuit as claimed in claim 5, wherein each fifth switching group has a capacitor connected to the first and second drivable bidirectional power semiconductor switches of the associated fifth switching group, wherein the capacitor of the first fifth switching group is connected to the junction point between the first drivable bidirectional power semiconductor switch of the first fifth switching group and the junction point between the second drivable bidirectional power semiconductor switch and the sixth drivable bidirectional power semiconductor switch of n-th second switching group, and wherein the capacitor of the first fifth switching group is connected to the junction point between the second drivable bidirectional power semiconductor switch of the first fifth switching group and the junction point between the fourth drivable bidirectional power semiconductor switch and the fifth drivable bidirectional power semiconductor switch of the n-th second switching group.

8. The converter circuit as claimed in claim 6, wherein each fifth switching group has a capacitor connected to the first and second drivable bidirectional power semiconductor switches of the associated fifth switching group, wherein the capacitor of the first fifth switching group is connected to the junction point between the first drivable bidirectional power semiconductor switch of the first fifth switching group and the second drivable bidirectional power semiconductor of the n-th second switching group, and wherein the capacitor of the first fifth switching group is connected to the junction point between the second drivable bidirectional power semiconductor switch of the first fifth switching group and the fourth drivable bidirectional power semiconductor switch of the n-th second switching group.

9. The converter circuit as claimed in claim 6, wherein the first fifth switching group has a capacitor connected to the first and second drivable bidirectional power semiconductor switches of the first fifth switching group, wherein the capacitor of the first fifth switching group is connected to the junction point between the first drivable bidirectional power semiconductor switch of the first fifth switching group and the second drivable bidirectional power semiconductor switch of the n-th second switching group, and wherein the capacitor of the first fifth switching group is connected to the junction point between the second drivable bidirectional power semiconductor switch of the first fifth switching group and the fourth drivable bidirectional power semiconductor switch of the n-th second switching group.

10. The converter circuit as claimed in claim 6, wherein the first fifth switching group and at least one further fifth switching group each have a capacitor connected to the first and second drivable bidirectional power semiconductor switches of the associated fifth switching, wherein the of the first fifth switching group is connected to the junction point between the first drivable bidirectional power semiconductor switch of the first fifth switching group and the second drivable bidirectional power semiconductor switch of the n-th second switching group, and wherein the capacitor of the first fifth switching group is connected to the junction point between the second drivable bidirectional power semiconductor switch of the first fifth switching group and the fourth drivable bidirectional power semiconductor switch of the n-th second switching group.

11. The converter circuit as claimed in claim 1, wherein the first, second, third, fourth, fifth and sixth drivable bidirectional power semiconductor switches of each second switching group each has at least two drivable bidirectional switching elements, wherein the drivable bidirectional switching elements are connected in series.

12. The converter circuit as claimed in claim 1, wherein the first and second drivable bidirectional power semiconductor switches of each fifth switching group each have at least two drivable bidirectional switching elements, wherein the drivable bidirectional switching elements are connected in series.

13. The converter circuit as claimed in claim 1, wherein the first and second drivable bidirectional power semiconductor switches of the third switching group and the first and second drivable bidirectional power semiconductor switches of the fourth switching group each have at least two drivable bidirectional switching elements, wherein the drivable bidirectional switching elements are connected in series.

14. The converter circuit as claimed in claim 10, wherein the first, second, third, fourth, fifth and sixth drivable bidirectional power semiconductor switches of each second switching group each has at least two drivable bidirectional switching elements, wherein the drivable bidirectional switching elements are connected in series.

15. The converter circuit as claimed in claim 11, wherein the first and second drivable bidirectional power semiconductor switches of each fifth switching group each have at least two drivable bidirectional switching elements, wherein the drivable bidirectional switching elements are connected in series.

16. The converter circuit as claimed in claim 13, wherein the first and second drivable bidirectional power semiconductor switches of the third switching group and the first and second drivable bidirectional power semiconductor switches of the fourth switching group each have at least two drivable bidirectional switching elements, wherein the drivable bidirectional switching elements are connected in series.

* * * * *